Figure 1:
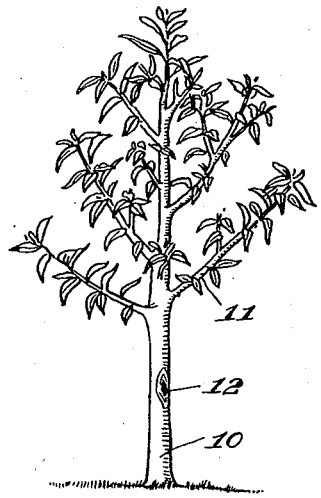

June 4, 1940.  R. J. RODOCKER  2,202,966
FRUIT TREE REPRODUCTION
Filed Aug. 13, 1938

Inventor
Ralph J. Rodocker.

By Kimmel & Crowell,
Attorney

Patented June 4, 1940

2,202,966

UNITED STATES PATENT OFFICE 2,202,966

FRUIT TREE REPRODUCTION

Ralph John Rodocker, Wichita Falls, Tex.

Application August 13, 1938, Serial No. 224,811

3 Claims. (Cl. 47—6)

This invention relates to tree production, and more particularly to a method in producing a fruit tree of the Prunus type, that is, the type embodying a nut inside the body of the fruit.

It is well known that fruit bearing trees do not reproduce from seed a satisfactory quality or quantity of fruit. This is due to the fact that the trees in their natural state had cross-pollinated one another of a similar species for a long period of time, and their seedlings would therefore produce fruit varying in size, quality and quantity.

It has heretofore been attempted in the production of fruit trees to reproduce by some form of graftage from a tree giving forth a satisfactory quality and quantity of fruit, and while this has to some extent been successful in favorable seasons in so far as the production of quality and quantity is concerned, nevertheless, this method of reproducing trees has not at any time had any effect on the too early blooming habit of the trees in the spring, or winter, which habit is a serious failing and the cause of great loss annually.

Very desirable fruit trees have also been satisfactorily produced by cross-pollination and testing, and in addition by means of grafting through the budding process. In each of these cases, however, the early blooming habit of the tree in spring has not been controlled, so that wherever relatively warm weather occurs in winter, the sap from the tree roots begins to flow upwardly into the branches of the trees thus starting too early or pre-seasonal blooming.

It is not unusual where warm weather occurs in very early spring that a second cold spell prevails which, after a tree has started to bud, will seriously affect the fruit.

From experimentation, I have found that the apple tree is one of the late blooming trees, and is rarely affected by an early warm spell of weather, so that when the trees begin to bud the buds are not seriously affected by any subsequent weather conditions, and my method will produce Prunus fruit trees which will bloom as safely as the apple tree.

In the reproduction of trees by the grafting process, buds or scions are transferred from a tree yielding a high quality and quantity of fruit to the body, limbs, root systems or pieces of roots of seedlings or other trees of the same species so that upon growing of the budded or grafted portion the new stock will bear the desired quality and quantity of fruit but such stock may be founded on a root or trunk structure of a different stock of the same species.

This budding process, however, does not affect the period of the initial growth of the trees in spring, and in order to produce a tree structure wherein the upper portion of the tree will bear the desired quality and quantity of fruit, and wherein the upper portion of the trees will be prevented from too early blooming due to unseasonable weather, I have produced a tree which includes a double budding process or grafting process wherein a root or trunk stock is initially used from the desired species, and on this trunk or base stock a first budding or grafting is imposed from a tree of the same species which has been known to be a late or safe blooming tree.

After this initial bud or graft has grown to the desired extent, a second bud or graft is set on the growth of the first bud or graft at a suitable point, the second bud or graft being from a tree bearing the desired quality and quantity of fruit.

The fruit trees which are contemplated in the present invention are fruit trees such as peach, plum, apricot, cherry, almond, and like Prunus type trees.

Figure 2:
Figure 3:
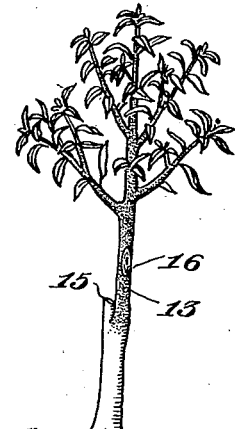
Figure 4:
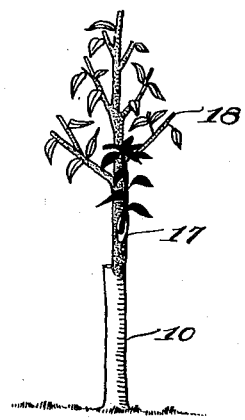
Figure 5:
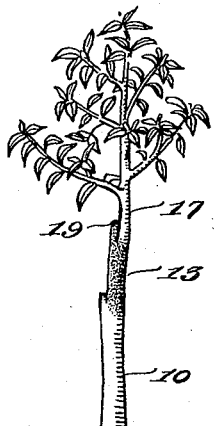
Figure 6:
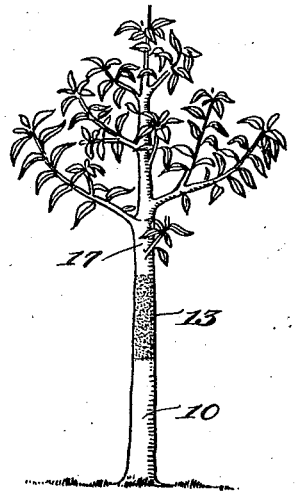

Figure 1 is a side elevation of a seedling used with this improved method,

Figure 2 is a similar view showing the budding of the intermediate stock on the seedling or root stock, Figure 3 is a similar view wherein the intermediate stock has been shown of a character to permit the second budding thereon, Figure 4 is a view similar to Figure 1 showing the budding of the top or fruit stock on the intermediate stock, Figure 5 is a view similar to Figure 4 showing the growth of the top or fruit stock with the growth of the intermediate stock cut off, and Figure 6 is a view of the completed tree.

In the drawing in Figure 1 there is disclosed a tree having a trunk 10 and a top or branch portion 11. This tree disclosed in Figure 1 may be a tree such as a peach tree of well known quality, and a suitable point on the trunk 10 of the tree a cut 12 is made and a bud 13 is applied in this cut and suitably sealed after a method well known, so that the bud 13 will take hold and form a part of the main trunk 10.

A short time after the bud 13 is grafted onto the trunk 10, the branches or top portion 11 of the tree are cut off as at 14 so that the sap from the tree will tend to be held back and forced into the grafted bud 13. In Figure 2 there is disclosed the bud 13 initially starting to grow and after this bud 13 has reached a pre-determined size the trunk portion of the tree above the bud 13 is cut off as at 15 so that all of the sap from the trunk 10 will enter the first budding 13. This budding 13 is taken from a tree of the same species, but it is taken from a tree which is known to be a late starting tree and one which has heretofore been seldom affected by unseasonable weather conditions in the spring.

This bud 13 is always taken from a tree which is relatively slower in blooming than other trees of the same species, so that the sap from the tree roots will not pass therethrough so early in the spring.

When the bud 13 has reached a pre-determined size, similar to that disclosed in Fig. 3, a slice or cut as at 16 is made in the new growth and a second bud 17 is grafted onto this cut portion 16 in the usual or well known manner. The end of the branches of the first grafting are cut off as at 18 so as to retard the growth of this first grafted portion and permit the sap to flow into the second grafted portion 17.

When this second grafted portion 17 has taken hold, the first grafted portion is cut off as at 19 and as shown in Figure 5, thus leaving an intermediate portion 13 from the first grafting which has a late blooming habit different from that of the trunk 10 and the second grafting 17. This intermediate section 13 operates as a slow opening valve so as to hold back the too early flow of sap from the trunk and root structure 10 to the top structure 17. In this manner when unseasonable weather occurs in the winter the sap rising in the lower trunk and root structure 10 will be held back or prevented from flowing too early to the top structure 17. Thus if especially warm weather occurs at an unseasonable period and subsequent cold weather occurs, the top 17 of the tree will not start blooming or budding and will not therefore be damaged by a subsequent period of cold weather.

It has been found from actual experiments that a tree produced in accordance with this invention will have the blooming period thereof the same as the blooming period of the intermediate or interposed trunk portion 13 so that it is possible after a tree has been found to be a late starting tree to reproduce a similar tree from grafted stock which is not the case if seedlings are grown from the late starting tree. It is well known that seedlings vary in the reproduction of fruit, not only in size, quality or quantity, but also in the growing or starting periods of such trees in the spring. However, having found a tree of the desired species which is a late starting tree, the same kind or character of tree can be readily reproduced by interposing a section of this late starting tree between the root and top stock of another tree.

It will be understood that the term "group" as herein used refers as an example to all of the varieties or species of one kind or class of Prunus fruit trees, such as all of the peach trees being one group. The term "variety or species" as herein used refers to trees of one group which produce fruit having the same physical characteristics and designated by a particular name. An example of "variety or species" is an Elberta peach tree.

What I claim is:

1. The method of reproducing Prunus fruit trees which includes the grafting of a bud or graft from a late blooming tree onto a stock of similar variety, and the grafting of a second bud or graft onto the stock formed by said first bud or graft whereby to provide an intermediate stock resulting from said first grafting having a character such that the sap from the lower stock and root will be initially retarded in its flow to the tree top formed by the second grafting or budding.

2. The method of reproducing Prunus fruit trees which consists of the use of a root stock of the desired variety, grafting a branch or bud of a similar variety onto the root stock, said branch or bud being taken from a late blooming tree stock, cutting the stock above the point of grafting, grafting a second branch or bud onto the stock of the first grafting, and cutting off the first stock above the second graft or bud.

3. The method of retarding the blooming time of an early blooming Prunus fruit tree of the Prunus group which consists in first grafting a bud having a late blooming characteristic onto a root stock of the same group and then grafting a second bud of the same group onto growth of the first bud to thereby form a trunk having an intermediate portion capable of retarding the blooming period of the growth of the second bud.

RALPH J. RODOCKER.